(12) United States Patent
Osborn

(10) Patent No.: US 8,103,274 B2
(45) Date of Patent: Jan. 24, 2012

(54) SYSTEM, METHOD, AND COMPUTER-READABLE MEDIUM FOR IP-FEMTOCELL PROVISIONED RADIO ACCESS NETWORK

(75) Inventor: Christopher Martin Edward Osborn, Allen, TX (US)

(73) Assignee: Airwalk Communications, Inc., Richardson, TX (US)

( * ) Notice: Subject to any disclaimer, the term of this patent is extended or adjusted under 35 U.S.C. 154(b) by 642 days.

(21) Appl. No.: 12/252,199

(22) Filed: Oct. 15, 2008

(65) Prior Publication Data

US 2009/0131062 A1  May 21, 2009

Related U.S. Application Data

(60) Provisional application No. 61/003,151, filed on Nov. 15, 2007.

(51) Int. Cl.
*H04W 4/00* (2009.01)

(52) U.S. Cl. ........................................... 455/435

(58) Field of Classification Search .................. None
See application file for complete search history.

(56) References Cited

U.S. PATENT DOCUMENTS

| 6,070,073 | A | 5/2000 | Maveddat et al. | |
|---|---|---|---|---|
| 7,031,747 | B2 | 4/2006 | Cyr et al. | |
| 7,127,248 | B1 | 10/2006 | Costa et al. | |
| 7,768,983 | B2 * | 8/2010 | Nylander et al. | 370/338 |
| 2003/0119518 | A1 | 6/2003 | Cleveland et al. | |
| 2005/0101329 | A1 | 5/2005 | Gallagher | |
| 2005/0186948 | A1 | 8/2005 | Gallagher et al. | |
| 2007/0014281 | A1 | 1/2007 | Kant | |
| 2007/0238448 | A1 | 10/2007 | Gallagher et al. | |
| 2007/0243872 | A1 | 10/2007 | Gallagher et al. | |
| 2007/0254648 | A1 | 11/2007 | Zhang et al. | |
| 2008/0096553 | A1 | 4/2008 | Saksena et al. | |
| 2008/0304462 | A1 | 12/2008 | Burgess et al. | |
| 2009/0092080 | A1 * | 4/2009 | Balasubramanian et al. | 370/328 |
| 2009/0111427 | A1 * | 4/2009 | Mack et al. | 455/411 |
| 2009/0129263 | A1 * | 5/2009 | Osborn | 370/230 |
| 2009/0129336 | A1 * | 5/2009 | Osborn | 370/331 |
| 2009/0129348 | A1 * | 5/2009 | Osborn | 370/338 |
| 2009/0129349 | A1 * | 5/2009 | Osborn | 370/338 |
| 2009/0131016 | A1 * | 5/2009 | Osborn | 455/411 |
| 2009/0131017 | A1 * | 5/2009 | Osborn | 455/411 |
| 2009/0131018 | A1 * | 5/2009 | Osborn | 455/411 |
| 2009/0131024 | A1 * | 5/2009 | Osborn | 455/414.1 |
| 2009/0131029 | A1 * | 5/2009 | Osborn | 455/418 |
| 2009/0131049 | A1 * | 5/2009 | Osborn | 455/435.1 |
| 2009/0131050 | A1 * | 5/2009 | Osborn | 455/435.1 |
| 2009/0131086 | A1 * | 5/2009 | Osborn | 455/466 |
| 2009/0257429 | A1 * | 10/2009 | Osborn | 370/352 |
| 2009/0258644 | A1 * | 10/2009 | Osborn | 455/432.1 |

* cited by examiner

*Primary Examiner* — Anh-Vu Ly

(57) ABSTRACT

A system, method, and computer readable medium for provisioning radio access via a femtocell system that includes integrated BTS and BSC functions are provided. The femtocell system is coupled with a packet switched backhaul and provides an IP-accessible radio access network. The femtocell system includes a session initiation protocol adapter that supports a SIP client pool and provides conversion of call set-up functions to SIP client set-up functions for provisioning of radio access to a user equipment. The user equipment may have a session initiation protocol client associated with the user equipment. The session initiation protocol client is hosted and registered with a registrar service by the femtocell system. Accordingly, telecommunication services may be directed to and from the user equipment over the packet-switched backhaul to the user equipment via the femtocell system.

18 Claims, 5 Drawing Sheets

```
600

610— REGISTER sip:example.com SIP/2.0
     Via: SIP/2.0/UDP
     From: sip:12145551212@example.com
     To: sip:12145551212@example.com
612— Contact: sip:12145551212@66.249.73.42
614— Contact: tel: +1-214-555-1212
```

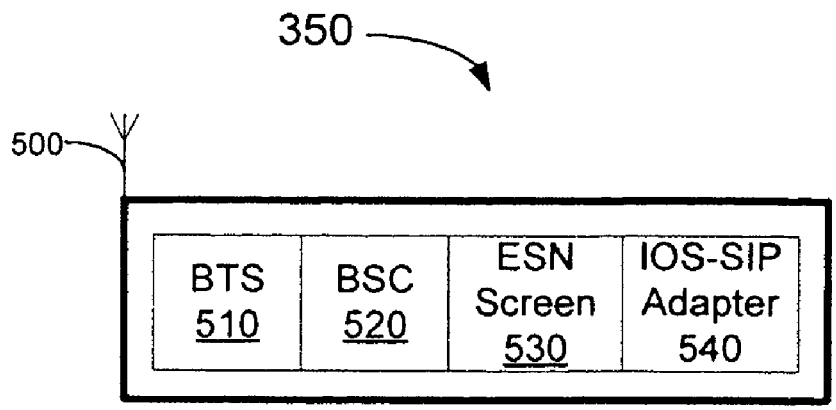
Figure 5A
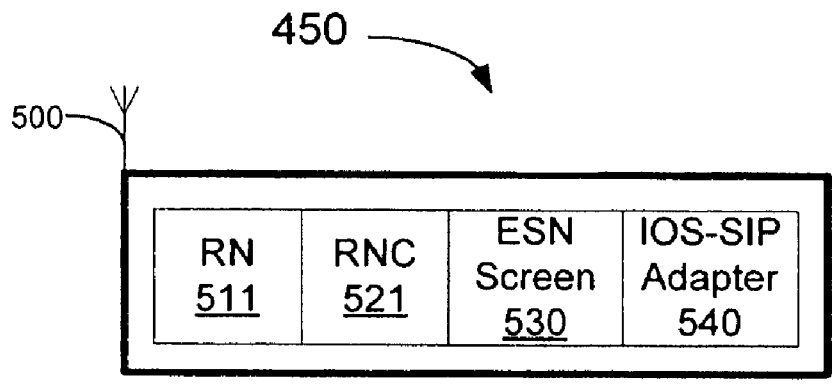
Figure 5B
600
610—REGISTER sip:example.com SIP/2.0
Via: SIP/2.0/UDP
From: sip:12145551212@example.com
To: sip:12145551212@example.com
612—Contact: sip:12145551212@66.249.73.42
614—Contact: tel: +1-214-555-1212
Figure 6

SYSTEM, METHOD, AND COMPUTER-READABLE MEDIUM FOR IP-FEMTOCELL PROVISIONED RADIO ACCESS NETWORK

CROSS REFERENCE TO RELATED APPLICATIONS

This application claims priority to U.S. provisional patent application Ser. No. 60/936,626 entitled FEMTOCELL filed Jun. 21, 2007, and claims priority to U.S. provisional patent application Ser. No. 61/003,151 entitled SIP-IOS ADAPTER FUNCTION filed Nov. 15, 2007, the disclosure of each of which is incorporated in its entirety herein by reference.

FIELD OF THE INVENTION

The present invention is generally related to radio access technologies and, more particularly, to mechanisms for Internet protocol (IP) provisioning of a femtocell radio access network.

BACKGROUND OF THE INVENTION

Contemporary cellular radio systems, or mobile telecommunication systems, provide an over-the-air interface to wireless user equipments (UEs) via a radio access network (RAN) that interfaces with at least one core network. The RAN may be implemented as, for example, a CDMA2000 RAN, a Universal Mobile Telecommunications System (UMTS) RAN, a Global System for Mobile communications (GSM) RAN, or another suitable radio access network implementation. The UEs may comprise, for example, a mobile terminal such as a mobile telephone, a laptop computer featuring mobile telephony software and hardware, a personal digital assistant (PDA), or other suitable equipment adapted to transfer and receive voice or data communications with the radio access network.

A RAN covers a geographical area comprised of any number of cells each comprising a relatively small geographic area of radio coverage. Each cell is provisioned by a cell site that includes a radio tower, e.g., a base transceiver station (BTS), and associated equipment. BTSs communicate with UEs over an air interface within radio range of the BTSs.

Numerous BTSs in the RAN may be communicatively coupled to a base station controller, also commonly referred to as a radio network controller (RNC). The BSC manages and monitors various system activities of the BTSs serviced thereby. BSCs are typically coupled with at least one core network.

BTSs are typically deployed by a carrier network in areas having a high population density. The traffic capacity of a cell site is limited by the site's capacity and affects the spacing of cell sites. In suburban areas, sites are often up to two miles apart, while cell sites deployed in dense urban areas may be as close as one-quarter of a mile apart. Because the traffic capacity of a cell site is finitely limited, as is the available frequency spectrum, mobile operators have a vested interest in technologies that allow for increased subscriber capacity.

A microcell site comprises a cell in a mobile phone network that covers a limited geographic area, such as a shopping center, hotel, airport, or other infrastructure that may have a high density mobile phone usage. A microcell typically uses power control to limit the radius the microcell coverage. Typically a microcell is less than a mile wide.

Although microcells are effective for adding network capacity in areas with high mobile telephone usage, microcells extensively rely on the RAN, e.g., a controlling BSC and other carrier functions. Because contemporary BSCs have limited processing and interface capacity, the number of BTSs—whether microcell BTSs or typical carrier BTSs—able to be supported by the BSC or other RAN functions is disadvantageously limited.

Contemporary interest exists in providing enterprise and office access, including small office/home office (SOHO) radio access, by an even smaller scale BTS. The radio coverage area of such a system is typically referred to as a femtocell. In a system featuring a femtocell, a UE may be authorized to operate in the femtocell when proximate the femtocell system, e.g., while the UE is located in the SOHO. When the UE moves beyond the coverage area of the femtocell, the UE may then be serviced by the carrier network. The advantage of deployment of femtocells are numerous. For instance, mobile users frequently spend large amounts of time located at, for example, home, and many such users rely extensively on cellular network service for telecommunication services during these times. For example, a recent survey indicated that nearly thirteen percent of U.S. cell phone customers do not have a landline telephone and rely solely on cell phones for receiving telephone service. From a carrier perspective, it would be advantageous to have telephone services provisioned over a femtocell system, e.g., deployed in the user's home, to thereby reduce the load, and effectively increase the capacity, on the carrier RAN infrastructure. However, due the large potential demand for femtocell systems, contemporary BTS interface mechanisms with a RAN via BSCs or equivalent RNCs is impractical due to scaling issues.

Therefore, what is needed is a mechanism that overcomes the described problems and limitations.

SUMMARY OF THE INVENTION

The present invention provides a system, method, and computer readable medium for provisioning radio access via a femtocell system that includes integrated BTS and BSC functions. The femtocell system is coupled with a packet switched backhaul and provides an IP-accessible radio access network. The femtocell system includes a session initiation protocol (SIP) adapter that supports a SIP client pool and provides conversion of call set-up functions to SIP client set-up functions for provisioning of radio access to a user equipment. A user equipment may have a session initiation protocol client associated with the user equipment. The session initiation protocol client is hosted and registered with a registrar service by the femtocell system. Accordingly, telecommunication services may be directed to and from the user equipment over the packet-switched backhaul to the user equipment via the femtocell system.

In one embodiment of the disclosure, a method for providing radio access network service is provided. The method comprises communicatively coupling a femtocell system with a packet-switched backhaul, allocating, by the femtocell system, a session initiation protocol client for a user equipment, and transmitting, by the femtocell system, a first registration message for the client with a registrar service, wherein the first registration message includes a first contact comprising a session initiation protocol uniform resource identifier assigned to the user equipment.

In another embodiment of the disclosure, a computer-readable medium having computer-executable instructions for execution by a processing system, the computer-executable instructions for providing radio access network service, is provided. The computer-readable medium comprises instructions for communicatively coupling a femtocell system with a packet-switched backhaul, allocating, by the femtocell system, a session initiation protocol client for a user equipment, and transmitting, by the femtocell system, a first registration message for the client with a registrar service, wherein the first registration message includes a first contact comprising a session initiation protocol uniform resource identifier assigned to the user equipment, and wherein the first registration message further includes a second contact comprising a telephone uniform resource identifier comprising a telephone number assigned to the user equipment.

In a further embodiment of the disclosure, a system for providing radio access network service is provided. The system comprises a radio access network including a base transceiver station adapted to provide communication services over a first air interface with a user equipment, wherein the first air interface is provisioned by a base transceiver station providing a macrocell. The system further includes a packet-switched network having a domain with which the user equipment has a session initiation protocol service subscription, and an Internet Protocol multimedia subsystem communicatively interfaced with the radio access network and the packet-switched network. The system further includes a femtocell system communicatively coupled with the packet-switched network and having an Internet protocol address assigned thereto. The femtocell system allocates a session initiation protocol client for the user equipment, transmits a first registration message for the client with a registrar service that includes a first contact comprising a session initiation protocol uniform resource identifier assigned to the user equipment, wherein the femtocell system further registers with the registrar service a second contact comprising a telephone uniform resource identifier comprising a telephone number assigned to the user equipment, and wherein the order of the first contact and the second contact specifies a preferred contact order for the user equipment.

BRIEF DESCRIPTION OF THE DRAWINGS

Aspects of the present disclosure are best understood from the following detailed description when read with the accompanying figures, in which:

FIG. 5A is a simplified diagrammatic representation of femtocell system depicted in FIG. 3 that may be connected with an IP backhaul in accordance with an embodiment;

FIG. 5B is a simplified diagrammatic representation of an alternative embodiment of a femtocell system that may be connected with an IP backhaul; and FIG. 6 is a diagrammatic representation of an exemplary session initiation protocol registration message generated by a femtocell system on behalf of a user equipment in accordance with an embodiment.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
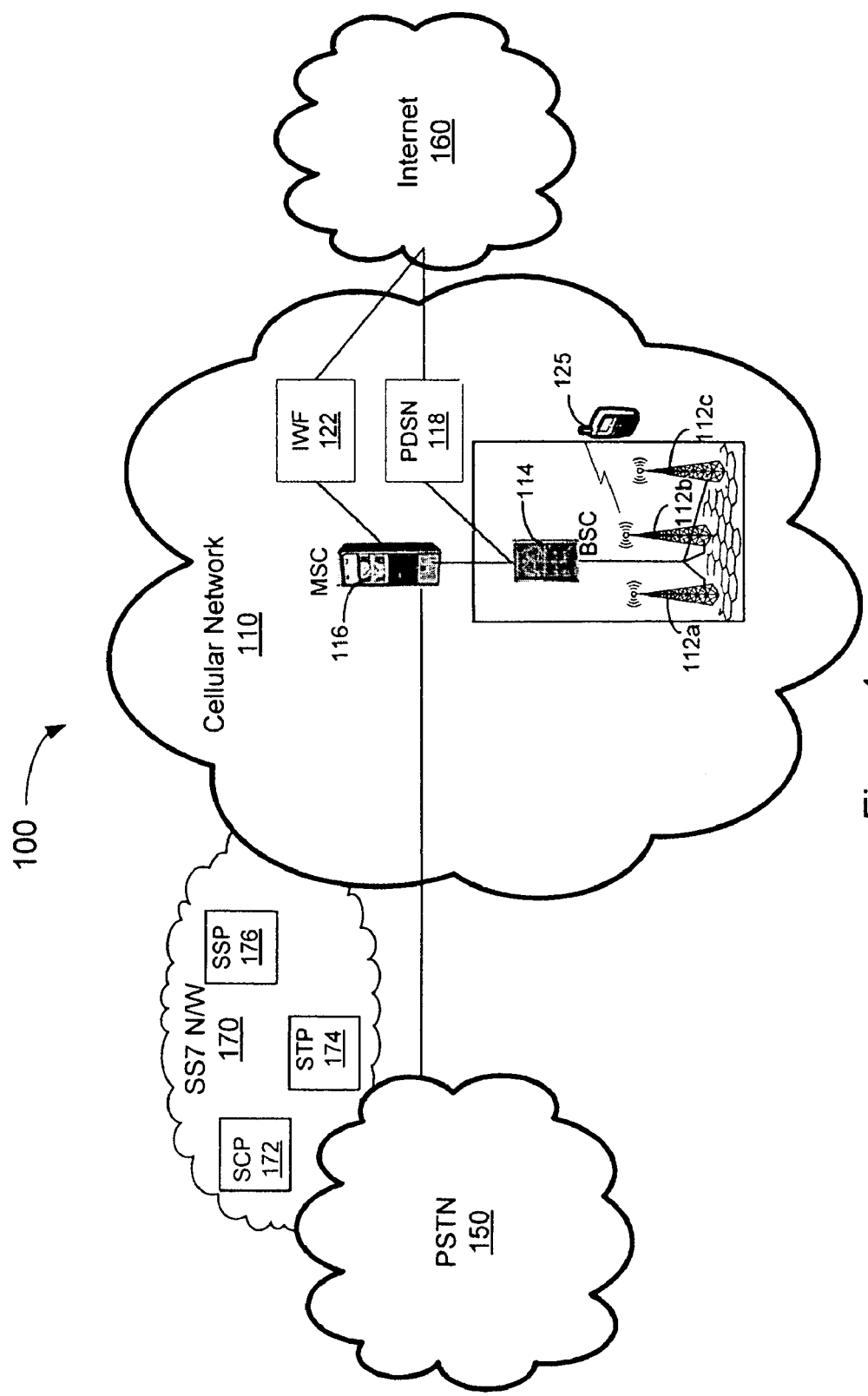
FIG. 1 is a diagrammatic representation of a network system that includes a cellular network adapted to provide macro-cellular coverage.

FIG. 1 is a diagrammatic representation of a network system 100 that includes a cellular network 110 adapted to provide macro-cellular coverage to a user equipment. Cellular network 110 may comprise, for example, a code-division multiple access (CDMA) network, such as a CDMA-2000 network.

Cellular network 110 may include any number of base transceiver stations (BTSs) 112a-112c communicatively coupled with a base station controller (BSC) 114 or RNC. Each individual BTS 112a-112c under the control of a given BSC may define a radio cell operating on a set of radio channels thereby providing service to a user equipment (UE) 125, such as a mobile terminal. BSC 114 manages the allocation of radio channels, receives measurements from mobile terminals, controls handovers, as well as various other functions as is understood. BSC 114 is interconnected with a mobile services switching center (MSC) 116 that provides mobile terminal exchange services. BSC 114 may be additionally coupled with a packet data serving node (PDSN) 118 or other gateway service that provides a connection point between the CDMA radio access network and a packet network, such as Internet 160, and provides mobility management functions and packet routing services. MSC 116 may communicatively interface with a circuit switched network, such as the public switched telephone network (PSTN) 150, and may additionally be communicatively coupled with an interworking function (IWF) 122 that provides an interface between cellular network 110 and PSTN 150.

System 100 may also include a signaling system, such as a signaling system #7 (SS7) network 170. SS7 network 170 provides a set of telephony signaling protocols which are used to set up the vast majority of the world's PSTN telephone calls. SS7 network 170 is also used in cellular networks for circuit switched voice and packet-switched data applications. As is understood, SS7 network 170 includes various signaling nodes, such as any number of service control points (SCPs) 172, signal transfer points (STPs) 174, and service switching points (SSPs) 176.

BTSs 112a-112c deployed in cellular network 110 may service numerous network 110 subscribers. Cell cites provided by BTSs 112a-112c commonly feature site ranges of a quarter to a half mile, e.g., in densely populated urban areas, to one to two miles in suburban areas. In other remotely populated regions with suitable geography, site ranges may span tens of miles and may be effectively limited in size by the limited transmission distance of relatively low-powered UEs. As referred to herein, a cell provided by a BTS deployed in carrier network 110 for access by any authorized network 110 subscriber is referred to as a macrocell.

Figure 2:
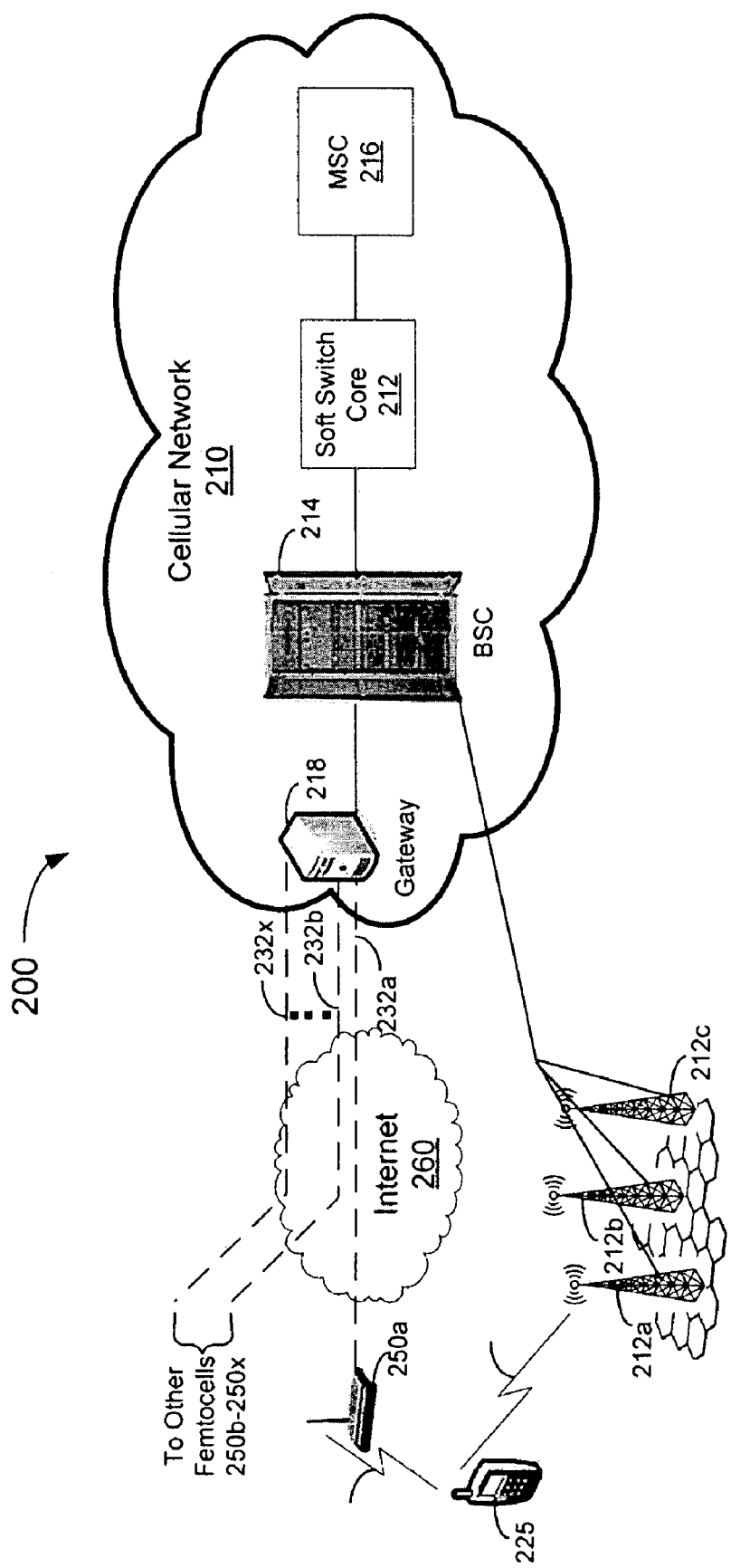
FIG. 2 is a diagrammatic representation of a conventional network system configuration featuring a femtocell.

FIG. 2 is a diagrammatic representation of a conventional network system 200 configuration featuring a femtocell. In the depicted example, a central BSC 214 deployed in a cellular carrier network 210 may connect with a soft switch core 212 that is connected with a MSC 216. MSC 216 connects with the cellular core network and may interface with other networks, such as the PSTN as is understood. BSC 214 may be connected with and service numerous BTSs 212a-212c that provide macrocells to cellular network 210 subscribers.

BSC 214 may additionally connect with a tunnel gateway system 218 that is adapted to establish secured tunnels 232a-232x with respective femtocell systems 250a-250x. Femtocells comprise cellular access points that connect to a mobile operator's network using, for example, a residential DSL or cable broadband connection. Femtocells 250a-250x provide a radio access point for UE 225 when the UE is within range of a femtocell system with which the UE has authorized access. For example, femtocell system 250a may be deployed in a residence of the user of UE 225. Accordingly, when the user is within the residence, mobile telecommunications may be provided to UE 225 via an air-interface provided by femtocell system 250a. In this instance, UE 225 is effectively offloaded from the macro BTS, e.g., BTS 212a, and communications to and from the UE are carried out with femtocell system 250a over Internet 260. Thus, femtocell systems 250a-250x may reduce the radio resource demands by off-loading UEs from macrocells to femtocells and thereby provide for increased subscriber capacity of cellular network 210.

In contemporary implementations such as that depicted in FIG. 2, a femtocell system 250a comprises a transceiver without intelligence and is thus required to be connected and managed by BSC 214. Thus, femtocell systems 250a-250x are reliant on the carrier network centralized BSC 214 which has limited capacity and thus does not exhibit desirable scaling characteristics or capabilities. Moreover, high communications overhead are realized by the BTS backhaul.

Figure 3:
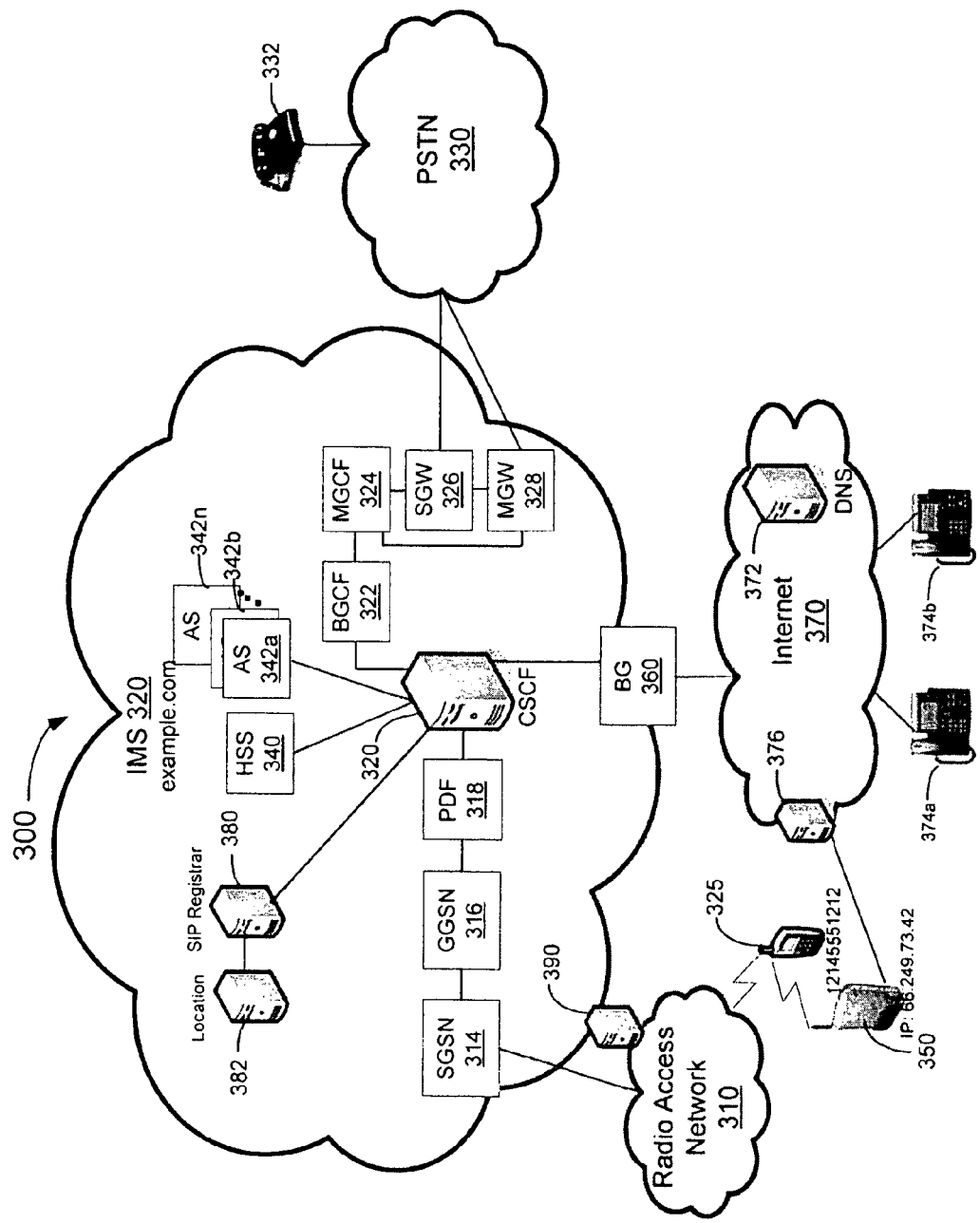
FIG. 3 is a diagrammatic representation of a network system in which a femtocell system implemented in accordance with an embodiment of the present invention may be deployed.

FIG. 3 is a diagrammatic representation of a network system 300 in which a femtocell system implemented in accordance with an embodiment of the invention may be deployed. System 300 includes a radio access network (RAN) 310 that provides an over-the-air interface with a UE 325, e.g., a mobile terminal. RAN 310 may comprise, for example, a CDMA radio access network or another suitable RAN. RAN 310 may comprise various BTSs and associated base station controllers BSCs as well as other infrastructure as is understood. UE 325 may be implemented as a personal digital assistant (PDA), a mobile phone, a computer, or another device adapted to interface with RAN 310.

System 300 may include an IP Multimedia Subsystem (IMS) 320 architecture adapted to provide IP service to UE 325. To this end, RAN 310 is communicatively coupled with a serving general packet radio service (GPRS) support node (SGSN) 314 and a gateway GPRS support node (GGSN) 316. SGSN 314 provides the delivery of data packets from and to UE 325 within its service area. GGSN 316 provides an interface between the GPRS backbone network and external packet data networks. GGSN 316 is communicatively coupled with a policy decision function (PDF) 318 that provides authorization of media plane resources, e.g., quality of service (QoS) authorizations, policy control, bandwidth management, and the like. PDF 318 may be communicatively coupled with a call session control function (CSCF) 320.

CSCF 320 comprises various session initiation protocol (SIP) servers or proxies that process SIP signaling packets in IMS 320. CSCF 320 may include a proxy-CSCF (P-CSCF) that provides a first point of contact for an IMS-compliant UE. The P-CSCF may be located in the visited network, or in the UE's home network if the visited network is not fully IMS-compliant. UE 325 may discover the P-CSCF, e.g., by using Dynamic Host Configuration Protocol (DHCP), or by assignment in a packet data protocol (PDP) context. CSCF 320 additionally includes a Serving-CSCF (S-CSCF) that comprises the central node of the signaling plane. The S-CSCF comprises a SIP server, but additionally performs session control. The S-CSCF is located in the home network and interfaces with a home subscriber server (HSS) 340 to download and upload user profiles. CSCF 320 further includes an Interrogating-CSCF (I-CSCF) that comprises a SIP function located at the edge of an administrative domain. The I-CSCF has an IP address that is published in the Domain Name System (DNS) 372 that facilitates location of the I-CSCF by remote servers. Thus, the I-CSCF is used as a forwarding point for receipt of SIP packets within the domain.

HSS 340 comprises a user database that supports the IMS network entities that manage calls. HSS 340 stores user profiles that specify subscription-related information of authorized users, authenticates and authorizes users, and provides information about the user's physical location. Various application servers (AS) 342a-342n that host and execute services interface with CSCF 320 via SIP.

CSCF 320 is coupled with a breakout gateway control function (BGCF) 322 that comprises a SIP server that provides routing functionality based on telephone numbers. BGCF 322 is used when a UE places a call from the IMS to a phone in a circuit switched network, e.g., PSTN 330, or the public land mobile network. A media gateway controller Function (MGCF) 324 performs call control protocol conversion between SIP and ISDN User Part (ISUP) and interfaces with a signaling gateway (SGW) 326. SGW 326 interfaces with the signaling plane of a circuit switched network, e.g., PSTN 330. SGW 326 may transform lower layer protocols, such as Stream Control Transmission Protocol (SCTP), into the Message Transfer Part (MTP) protocol, and pass ISUP data from MGCF 324 to PSTN 330 or another circuit switched network. A media gateway (MGW) 328 interfaces with the media plane of PSTN 330 or another circuit switched network by converting data between real-time transport protocol (RTP) and pulse code modulation (PCM), and may also be employed for transcoding when the codecs of the IMS and circuit switched networks differ. Resources of MGW 328 are controlled by MGCF 324. Fixed access, e.g., IP telephony devices 374a-374b, may connect with IMS network via Internet 370 that is communicatively coupled with IMS network 320 by way of border gateway 360.

As is understood, DNS 372 comprises a scalable namespace that facilitates access to entities deployed on the Internet or private networks. DNS 372 maintains various records for host names, servers, and the like. For example, DNS 372 maintains records (commonly referred to as "A records") that map hostnames to IP addresses, pointer (PTR) records that map IP addresses to canonical names to facilitate reverse DNS lookups, service (SRV) records that specify information on available services, naming authority pointer (NAPTR) records that facilitate regular expression based rewriting, and various other records. DNS 372 may additionally include a telephone number mapping (ENUM) system that facilitates resolution of SIP addresses from E.164 number as is understood.

In accordance with an embodiment, a femtocell system 350 may include integrated BTS and BSC functions and may feature additional capabilities available in the provided femtocell site coverage area. Femtocell system 350 provides an IP-accessible radio access network, is adapted for operation with IMS 320, and provides radio link control functions. Femtocell system 350 may be communicatively coupled with Internet 370 via any variety of backhaul technologies, such as an 802.11x link, a 10/100 BaseT LAN link, a T1/E1 Span or fiber, cable set top box, DSL modem connected with a central office digital subscriber line access multiplexer, a very small aperture terminal (VSAT), or another suitable backhaul infrastructure.

In an embodiment, femtocell system 350 includes a session initiation protocol (SIP) adapter that supports a SIP client pool and provides conversion of call set-up functions to SIP client set-up functions. Additionally, femtocell system 350 includes electronic serial number (ESN) screening and/or Mobile Equipment Identifier (MEID) screening to allow only designated UEs to access the femtocell thereby restricting access to authorized home or small office UEs. Provisioning of ESN(s) or MEIDs may be made as part of an initial femtocell system 350 activation. In the illustrative example, femtocell system 350 is allocated an Internet Protocol (IP) address of "66.249.73.42", and UE 325 is allocated a mobile services ISDN (MSISDN) number, or E.164 number, of "12145551212".

Figure 4:
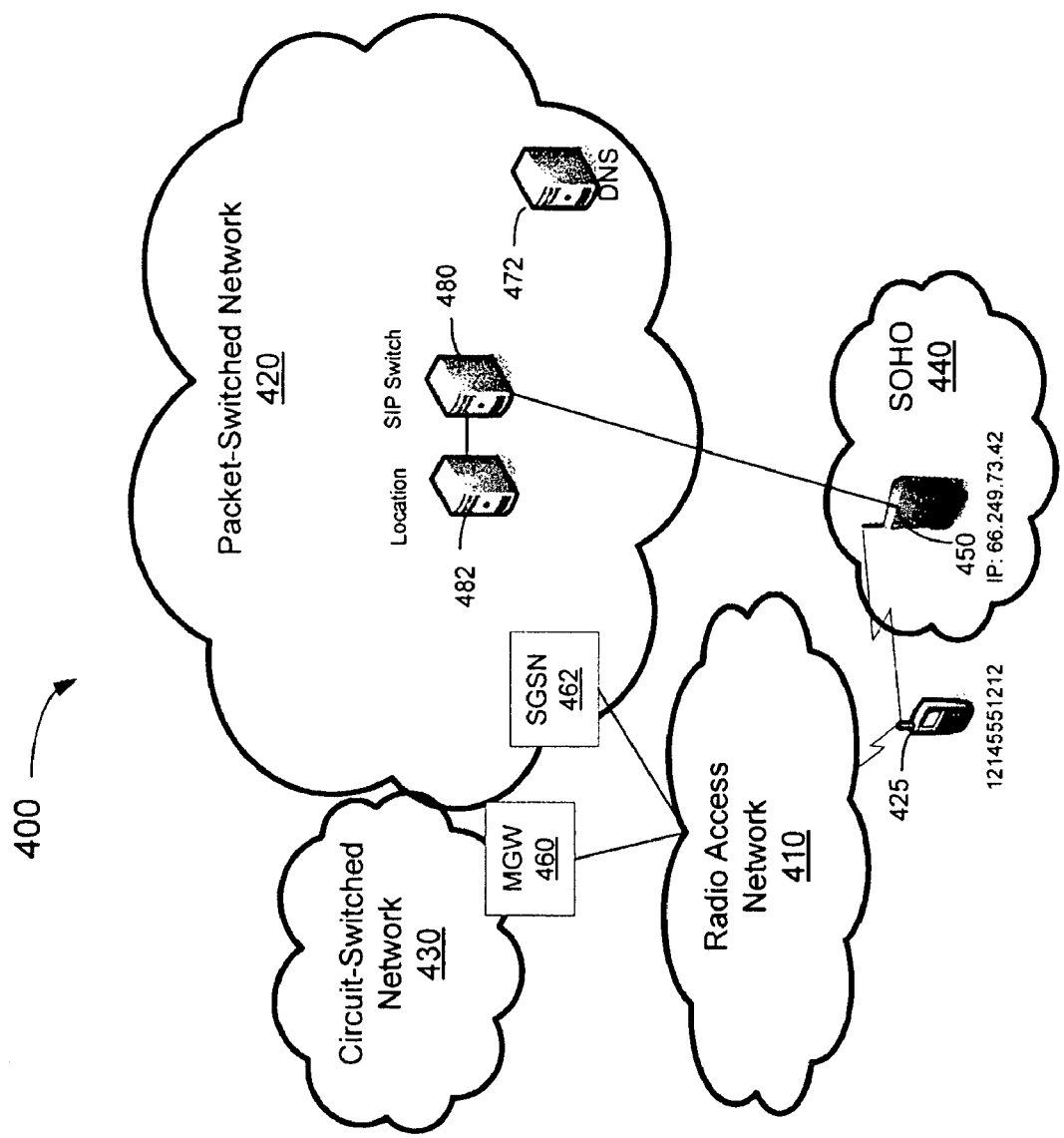
FIG. 4 is a diagrammatic representation of a network system in which a femtocell system implemented in accordance with an alternative embodiment of the invention may be deployed.

FIG. 4 is a diagrammatic representation of a network system 400 in which a femtocell system implemented in accordance with an alternative embodiment of the invention may be deployed. System 400 includes a radio access network (RAN) 410 that provides an over-the-air interface with a UE 325, e.g., a mobile terminal. RAN 410 may comprise, for example, a Universal Mobile Telecommunications System (UMTS) network that implements, for example, a CDMA2000 air interface. To this end, UE 325 may be implemented as a 3G-compliant handset. RAN 410 comprises various radio network controllers (RNCs), radio nodes (RNs), also referred to as "Node Bs", as well as other infrastructure as is understood.

One or more RNCs of RAN 410 provide an interface between RAN 410 and a circuit switched network 430, such as the PSTN or a circuit-switched cellular network, and a packet-switched network 420, such as the Internet. RNCs of RAN 410 may interface with the circuit-switched network 430 via a media gateway (MGW) 460 and may interface with the packet-switched network 420 via a Serving GPRS Support Node (SGSN) 462. SGSN 462 provides the delivery of data packets from and to UE 325 when UE 325 is located within its service area. DNS 472 facilitates access to entities deployed on the Internet or private networks as is understood.

In accordance with an embodiment, a femtocell system 450 may be implemented as a 3G-complinat entity, e.g., to service UMTS mobile terminals, and may be deployed in a SOHO or other suitable enterprise. To this end, femtocell system 450 may include an integrated RNC and RN. In a particular implementation, femtocell system 450 may be implemented as an Evolution-Data Optimized (EV-DO) entity, e.g., a 1xEV-DO integrated IP-RAN. Femtocell system 450 provides an IP-accessible radio access network and provides radio link control functions and may directly connect with a SIP switch 480, e.g., via an Ethernet backhaul or another suitable backhaul infrastructure. SIP switch 480 may include or interface with various application servers and, in general, includes or interfaces with a location server 482 as well as registrar, redirect, and proxy servers as is understood. SIP switch 480 may be communicatively interfaced with RAN 410 and circuit-switched network 430 via suitable gateways.

Similar to femtocell system 350 described above, femtocell system 450 includes a session initiation protocol (SIP) adapter that supports a SIP client pool and provides conversion of call set-up functions to SIP client set-up functions. Additionally, femtocell system 450 includes ESN or MEID screening to allow only designated UEs to access the femtocell thereby restricting access to authorized home or small office UEs. Provisioning of ESN(s) or MEID(s) may be made as part of an initial femtocell system activation.

FIG. 5A is a simplified diagrammatic representation of femtocell system, such as femtocell 350 depicted in FIG. 3, that facilitates provisioning of a femto-RAN in accordance with an embodiment. Femtocell system 350 includes an antenna 500 coupled with a BTS 510. BTS 510 may be implemented, for example, as a 1xRTT ASIC device and may comprise a non-diversity receiver featuring a built-in duplexer. In an embodiment, BTS 510 may feature only one operational band and may include a transmitter scan receiver and local oscillator. BTS 510 may be communicatively coupled with a BSC 520 that provides radio control functions, such as receiving measurements from UEs, such as mobile phones, control of handovers to and from other femtocell systems, and may additionally facilitate handoff to or from macrocells.

Femtocell system 350 includes an electronic serial number screening function 530 that may facilitate approving or rejecting service for a UE by femtocell system 350. Additionally femtocell system 350 includes an Internet Operating System (IOS) and SIP Adapter (collectively referred to as IOS-SIP Adapter 540). IOS-SIP adapter 540 may invoke and manage SIP clients, such as a user agent (UA) pool comprising one or more UAs. In accordance with an embodiment, each UE 325 authorized to be serviced by femtocell system 350 may have a UA allocated therefor by femtocell system 350 in a manner that facilitates transmission of communications to and from a UE over an IP backhaul. Accordingly, when an authorized UE is within the femtocell system 350 site range, telecommunication services may be provided to the UE via the IP backhaul and femtocell system 350 provisioned RAN. When the UE is moved beyond the service range of femtocell system 350, telecommunication service may then provided to the UE via macrocellular coverage.

To facilitate routing of calls from circuit switched call originators, femtocell system 350 may perform a DNS/ENUM registration on behalf of UEs authorized to obtain service from femtocell system 350. In the present example, assume UE 325 with a MSISDN of "12145551212" has a SIP service subscription in the domain "example.com" and has a SIP uniform resource identifier (URI) of "12145551212@example.com". An example DNS/ENUM registration message generated by femtocell system 350 on behalf of UE 325 and transmitted to DNS 372 is as follows:

```
$ORIGIN 2.1.2.1.5.5.5.4.1.2.1.e164.arpa.
    IN NAPTR 100 10 "u" "E2U+sip"
    "!^.*$!sip:12145551212@example.com!".
```

As is understood, the first line of the registration message comprises the MSISDN number of the UE converted (i.e., reversed with each numeral delineated with a "." character and appended with the e164.arpa domain) for DNS lookup. The second line of the registration message specifies the NAPTR record for the hosts that can further process the address—the domain "example.com" (in which the UE with a URI of 12145551212@example.com is registered) in the present example.

In accordance with another embodiment, femtocell system 350 may generate and issue a SIP registration on behalf of UE 325 authorized for service access by femtocell system 350.

FIG. 5B is a simplified diagrammatic representation of femtocell system 450 depicted in FIG. 4 that facilitates provisioning of a femto-RAN in accordance with an alternative embodiment. Femtocell system 450 includes an antenna 500 coupled with a RN 511. RN 511 may be implemented, for example, as a 1xEV-DO ASIC device. For example, RN 511 may provide a 1xEV-DO Rev. 0 air interface or a 1xEV-DO Rev. A air interface. RN 511 may be communicatively coupled with a RNC 521 that provides radio control functions, such as receiving measurements from UEs, control of handovers to and from other femtocell systems, and may additionally facilitate handoff to or from macrocells. RNC 521 may also provide encryption/decryption functions, power, load, and admission control, packet scheduling, and various other services.

Femtocell system 450 includes an electronic serial number screening function 530 that may facilitate approving or rejecting service for a UE by femtocell system 450. Additionally, femtocell system 450 includes an Internet Operating System (IOS) and SIP Adapter (collectively referred to as IOS-SIP Adapter 540). IOS-SIP adapter 540 may invoke and manage SIP clients, such as a user agent (UA) pool comprising one or more UAs. Each UE 425 authorized to be serviced by femtocell system 450 may have a UA allocated therefor by femtocell system 450 in a manner that facilitates transmission of communications to and from a UE over an IP backhaul. Accordingly, when an authorized UE is within the femtocell system 450 site range, telecommunication services may be provided to the UE via the IP backhaul and the femtocell system 450 provisioned RAN. When the UE is moved beyond the service range of femtocell system 450, telecommunication service may then be provided to the UE via macrocellular coverage. Femtocell system 450 may perform a DNS/ENUM registration on behalf of UEs authorized to obtain service from femtocell system 450 and may generate and issue a SIP registration on behalf of a UE authorized for service access by the femtocell system 450 in a manner similar to that described above with reference to femtocell system 350.

FIG. 6 is a diagrammatic representation of an exemplary SIP registration message 600 generated by femtocell system 350 on behalf of UE 325 authorized for service access thereby in accordance with an embodiment. Registration message may be transmitted from femtocell system 350 to a SIP registrar service, e.g., to SIP Registrar 380 via CSCF 320. Registrar 380 may provide the location and contact information to location service 382. Registration message 600 includes a REGISTER field 610 that specifies the registration is being made within the domain "example.com". In accordance with an embodiment, multiple contacts are included in registration message 600. In the present example, registration message 600 includes a contact field 612 that specifies a SIP contact for UE 325. Notably, the SIP contact field 612 for UE 325 specifies the UA registered on behalf of UE with the URI 12145551212@example.com is located at the IP address of "66.249.73.42". That is, the SIP contact registered by femtocell system 350 on behalf of UE 325 is to be addressed at the femtocell system 350 address of 66.249.73.42 thereby resulting in routing of SIP signaling messages to femtocell system 325. In turn, femtocell system 350 may convert SIP call set up messaging to RAN signaling, allocate an uplink and a downlink channel for UE 325, and set up a call or data session thereon.

In the present example, registration message 600 includes a second contact field 614 that specifies a telephone URI, e.g., the MSISDN+1-214-555-1212 of UE 325. Thus, a location query for the SIP URI sip:12145551212@example.com would return two contacts. The first is the SIP URI that can be used to reach femtocell system 350, and thus UE 325 thereby, and the second is the telephone URI that can be used to reach UE 325 via macrocellular coverage, i.e., via RAN 310. As is understood, the order of contacts 612-614 provides a contact preference. As is understood, the multiple contacts may be registered in separate registration messages, and the depicted registration message including both the SIP contact URI and telephone URI is exemplary only. Accordingly, in the present example, an attempt to contact UE 325 may first be made via the SIP URI 12145551212@example.com. In the event that the session is not successfully set up via the SIP contact, an attempt may be made to setup a session via RAN 310.

When the UE 325 moves outside the coverage area of femtocell system 350, another registration may be generated and submitted by femtocell system 350 on behalf of UE where the telephone URI is designated as the preferred contact. Further, the SIP URI may be removed from the registration when the UE 325 moves outside the coverage area of femtocell system 350 thereby avoiding any attempts to establish a session with UE 325 via femtocell system 350 when UE 325 has moved beyond the femtocell system 350 coverage area.

To better facilitate an understanding of disclosed embodiments, consider a call placed at circuit switched telephone 332 to UE 325. A gateway receives the call setup request, e.g., an Initial Address Message (IAM), and a query may be made with DNS 372 from which the domain "example.com" is resolved from the ENUM function. An INVITE message is then transmitted to the example.com domain which, in turn, resolves the location of the called UE 325. Particularly, CSCF 320 may interrogate location server 382 and determine UE 325 is registered as located at the IP address 66.249.73.42. Accordingly, the INVITE message is routed to proxy server 376 which forwards the INVITE message to femtocell system 350. Femtocell system 350 may then perform paging, channel allocation, and other procedures for provisioning a radio interface with UE 325 and issue SIP responses on behalf of UE 325. Thus, from a network perspective, femtocell system 350 appears as a user equipment to which the call is directed. Further, UE 325 does not require a SIP client for receiving the call because femtocell system 350 advantageously performs signaling and media conversion for signaling and media transmissions over the air interface with 325. To this extent, femtocell system 350 may appear as a conventional BTS to UE 325. A call from UE 325 to another terminal, such as circuit-switched telephone 332, a SIP client such as packet-switched telephony device 374a, or another device, may similarly be facilitated by femtocell system 350.

As a second example, assume UE 325 has moved beyond the range of femtocell system 350. As noted above, femtocell system 350 may generate and transmit a registration message that excludes the SIP contact to facilitate provisioning of telecommunication services via macrocell coverage, e.g., via RAN 310. For instance, femtocell system 350 may periodically perform power measurements with UE 325, and upon the power measurement dropping below a particular power threshold, femtocell system may determine UE 325 is to be serviced by macrocellular coverage. Alternatively, a user may select macrocellular coverage via a user interface provided on UE 325. In this instance, UE 325 may provide an indication to femtocell system 350 that telecommunication services are to be provided by RAN 310. Other scenarios may similarly result in a determination that UE 325 is to be serviced by RAN 310. Upon such a determination, femtocell system 350 may generate and transmit a registration message on behalf of UE 325 to a registrar service, e.g., CSCF 320 and SIP registrar 380. The contact information may then be updated in location server 382 to indicate the telephone URI as the contact of UE 325. In this scenario, consider a call placed at circuit switched telephone 332 to UE 325. A gateway receives the call setup request, e.g., an Initial Address Message (IAM), and a query may be made with DNS server 372 from which the domain "example.com" is resolved from the ENUM service. An INVITE message is then transmitted to the example.com domain which resolves the location of called UE 325. In the present example, CSCF 320 may interrogate location server 382 and determine UE 325 has a preferred contact registered as a telephone URI of 2145551212. Accordingly, the INVITE message is routed to a gateway server, e.g., gateway server 390 which translates the INVITE message to a RAN-compliant call request signaling. The call may then be setup via RAN 310 accordingly.

As described, mechanisms for provisioning radio access via a femtocell system that includes integrated BTS and BSC functions are provided. The femtocell system is coupled with a packet switched backhaul and provides an IP-accessible radio access network. The femtocell system includes a session initiation protocol (SIP) adapter that supports a SIP client pool and provides conversion of call set-up functions to SIP client set-up functions for provisioning of radio access to a user equipment. A user equipment may have a session initiation protocol client associated with the user equipment. The session initiation protocol client is hosted and registered with a registrar service by the femtocell system. Accordingly, telecommunication services may be directed to and from the user equipment over the packet-switched backhaul to the user equipment via the femtocell system.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of providing radio access network service, comprising:
   communicatively coupling a femtocell system with a packet-switched backhaul;
   allocating, by the femtocell system, a session initiation protocol client for a user equipment; and
   transmitting, by the femtocell system, a first registration message for the client to a registrar service, wherein the first registration message includes a first contact comprising a session initiation protocol uniform resource identifier assigned to the user equipment, wherein the first registration message further includes a second contact comprising a telephone uniform resource identifier comprising a telephone number assigned to the user equipment.

2. The method of claim 1, wherein the order of the first contact and the second contact specifies a preferred contact order for the user equipment.

3. The method of claim 1, further comprising registering the user equipment with a domain name system server that associates a telephone number of the user equipment with a domain in which the user equipment has a session initiation protocol service subscription.

4. The method of claim 1, further comprising:
   receiving, by the femtocell system, a session initiation protocol call set-up message specifying the session initiation protocol uniform resource identifier as the recipient;
   converting the session initiation protocol set-up message into a radio access network-compliant signaling message; and
   transmitting the radio access network-compliant signaling message over an air interface to the user equipment.

5. The method of claim 1, further comprising:
   receiving, by the femtocell system, a signaling message comprising a call set-up request over an air interface from the user equipment, wherein the signaling message comprises a radio access network-compliant signaling message;
   converting the call set-up request into a session initiation protocol request message that includes the session initiation protocol uniform resource identifier as an originator of the session initiation protocol request message; and
   transmitting the session initiation protocol request message over the packet-switched backhaul.

6. The method of claim 1, further comprising transmitting, by the femtocell system, a second registration message for the client to a registrar service, wherein the second registration message includes a first contact comprising a telephone uniform resource identifier comprising a telephone number assigned to the user equipment, and wherein telecommunication services are provided to the user equipment by a macro-cellular system subsequent to transmission of the second registration message.

7. The method of claim 1, wherein the session initiation protocol client comprises a user agent.

8. A non-transitory computer-readable medium having computer-executable instructions for execution by a processing system, the computer-executable instructions for providing radio access network service, the computer-readable medium comprising instructions for:
- communicatively coupling a femtocell system with a packet-switched backhaul;
- allocating, by the femtocell system, a session initiation protocol client for a user equipment;
- transmitting, by the femtocell system, a first registration message for the client to a registrar service, wherein the first registration message includes a first contact comprising a session initiation protocol uniform resource identifier assigned to the user equipment, and wherein the first registration message further includes a second contact comprising a telephone uniform resource identifier comprising a telephone number assigned to the user equipment.

9. The non-transitory computer-readable medium of claim 8, wherein the order of the first contact and the second contact specifies a preferred contact order for the user equipment.

10. The non-transitory computer-readable medium of claim 8, further comprising instructions for registering the user equipment with a domain name system server that associates a telephone number of the user equipment with a domain in which the user equipment has a session initiation protocol service subscription.

11. The non-transitory computer-readable medium of claim 8, further comprising instructions for:
- receiving, by the femtocell system, a session initiation protocol call set-up message specifying the session initiation protocol uniform resource identifier as the recipient;
- converting the session initiation protocol set-up message into a radio access network-compliant signaling message; and
- transmitting the radio access network-compliant signaling message over an air interface to the user equipment.

12. The non-transitory computer-readable medium of claim 8, further comprising instructions for:
- receiving, by the femtocell system, a signaling message comprising a call set-up request over an air interface from the user equipment, wherein the signaling message comprises a radio access network-compliant signaling message;
- converting the call set-up request into a session initiation protocol request message that includes the session initiation protocol uniform resource identifier as an originator of the session initiation protocol request message; and
- transmitting the session initiation protocol request message over the packet-switched backhaul.

13. The non-transitory computer-readable medium of claim 8, further comprising instructions for transmitting, by the femtocell system, a second registration message for the client with a registrar service, wherein the second registration message includes a first contact comprising a telephone uniform resource identifier comprising a telephone number assigned to the user equipment, and wherein telecommunication services are provided to the user equipment by a macrocellular system subsequent to transmission of the second registration message.

14. The non-transitory computer-readable medium of claim 8, wherein the session initiation protocol client comprises a user agent.

15. A system for providing radio access network services, the system comprising:
- a radio access network including a base transceiver station adapted to provide communication services over a first air interface with a user equipment, wherein the first air interface is provisioned by a base transceiver station providing a macrocell;
- a packet-switched network having a domain with which the user equipment has a session initiation protocol service subscription;
- an Internet Protocol multimedia subsystem communicatively interfaced with the radio access network and the packet-switched network; and
- a femtocell system communicatively coupled with the packet-switched network and having an Internet protocol address assigned thereto, wherein the femtocell system allocates a session initiation protocol client for the user equipment, transmits a first registration message for the client to a registrar service that includes a first contact comprising a session initiation protocol uniform resource identifier assigned to the user equipment, wherein the femtocell system further registers with the registrar service a second contact comprising a telephone uniform resource identifier comprising a telephone number assigned to the user equipment, and wherein the order of the first contact and the second contact specifies a preferred contact order for the user equipment.

16. The system of claim 15, further comprising a domain name system server, wherein the femtocell system registers the user equipment with the domain name system server that associates the telephone number of the user equipment with the domain.

17. The system of claim 15, wherein the femtocell system receives at least one session initiation protocol call set-up message specifying the session initiation protocol uniform resource identifier as the recipient, converts the at least one session initiation protocol set-up message into a radio access network-compliant signaling message, and transmits the radio access network-compliant signaling message over an air interface to the user equipment.

18. The system of claim 15, wherein the femtocell system receives a signaling message comprising a call set-up request over an air interface from the user equipment, wherein the signaling message comprises a radio access network-compliant signaling message, converts the call set-up request into a session initiation protocol request message that includes the session initiation protocol uniform resource identifier as an originator of the session initiation protocol request message, and transmits the session initiation protocol request message over the packet-switched backhaul.

* * * * *